(12) United States Patent
Choi

(10) Patent No.: US 11,053,850 B2
(45) Date of Patent: Jul. 6, 2021

(54) GAS TURBINE

(71) Applicant: DOOSAN HEAVY INDUSTRIES & CONSTRUCTION CO., LTD., Changwon-si (KR)

(72) Inventor: Jae Yeon Choi, Busan (KR)

(*) Notice: Subject to any disclaimer, the term of this patent is extended or adjusted under 35 U.S.C. 154(b) by 141 days.

(21) Appl. No.: 16/116,924

(22) Filed: Aug. 30, 2018

(65) Prior Publication Data
US 2020/0025382 A1 Jan. 23, 2020

(30) Foreign Application Priority Data
Sep. 29, 2017 (KR) .......................... 10-2017-0126850

(51) Int. Cl.
*F01D 5/18* (2006.01)
*F02C 7/18* (2006.01)

(52) U.S. Cl.
CPC ............. *F02C 7/18* (2013.01); *F01D 5/186* (2013.01); *F05D 2220/32* (2013.01); *F05D 2240/303* (2013.01); *F05D 2260/20* (2013.01); *F05D 2260/201* (2013.01)

(58) Field of Classification Search
CPC .................................. F01D 5/186; F01D 5/187
See application file for complete search history.

(56) References Cited

U.S. PATENT DOCUMENTS

| 5,902,093 A * | 5/1999 | Liotta | F01D 5/20 |
| | | | 415/115 |
| 6,220,817 B1 * | 4/2001 | Durgin | F01D 5/187 |
| | | | 415/115 |
| 7,850,428 B2 * | 12/2010 | Tibbott | F01D 5/186 |
| | | | 416/97 R |
| 8,201,621 B2 * | 6/2012 | Hatman | F01D 5/187 |
| | | | 138/38 |
| 8,210,814 B2 * | 7/2012 | Zausner | F01D 5/187 |
| | | | 416/97 R |
| 9,039,371 B2 * | 5/2015 | Lee | F01D 5/187 |
| | | | 416/97 R |

(Continued)

FOREIGN PATENT DOCUMENTS

| JP | H08-270402 A | 10/1996 |
| KR | 1998-0024232 A | 7/1998 |

OTHER PUBLICATIONS

A Korean Office Action dated Apr. 25, 2019 in connection with Korean Patent Application No. 10-2017-0126850 which corresponds to the above-referenced U.S. application.

(Continued)

*Primary Examiner* — Justin D Seabe

(57) ABSTRACT

A gas turbine includes a turbine blade including a leading edge, a trailing edge, and a plurality of partition walls defining a cooling passage for passing cooling air inside the turbine blade, a first partition wall of the plurality of partition walls facing the leading edge; and an injection nozzle disposed in the first partition wall to cool an inner surface of the leading edge. The injection nozzle includes a nozzle protrusion protruding from the first partition wall toward the leading edge and surrounding an injection hole formed in the first partition wall. Thus, a flow direction of cooling fluid to be supplied to the leading edge can be guided, and deformation and damage to turbine blade components can be prevented.

12 Claims, 10 Drawing Sheets

(56) References Cited

U.S. PATENT DOCUMENTS

| | | | |
|---|---|---|---|
| 9,296,039 B2 * | 3/2016 | Propheter-Hinckley | ................... B22F 3/105 |
| 9,394,798 B2 * | 7/2016 | Crites | ................... F01D 5/187 |
| 9,828,859 B2 * | 11/2017 | Yokoyama | ................ F01D 5/20 |
| 10,208,603 B2 * | 2/2019 | Xu | .......................... F01D 5/187 |
| 10,232,421 B2 * | 3/2019 | Nakaura | ................... B21C 1/22 |
| 10,641,099 B1 * | 5/2020 | Waite | .................... F01D 5/187 |
| 2004/0096313 A1 | 5/2004 | Harvey et al. | |
| 2009/0317258 A1 * | 12/2009 | Tibbott | .................. F01D 5/187 416/97 R |
| 2010/0068069 A1 * | 3/2010 | Ahmad | .................. F01D 5/186 416/97 R |

OTHER PUBLICATIONS

A Korean Office Action dated Sep. 13, 2018 in connection with Korean Patent Application No. 10-2017-0126850 which corresponds to the above-referenced U.S. application.

* cited by examiner

[FIG. 1]
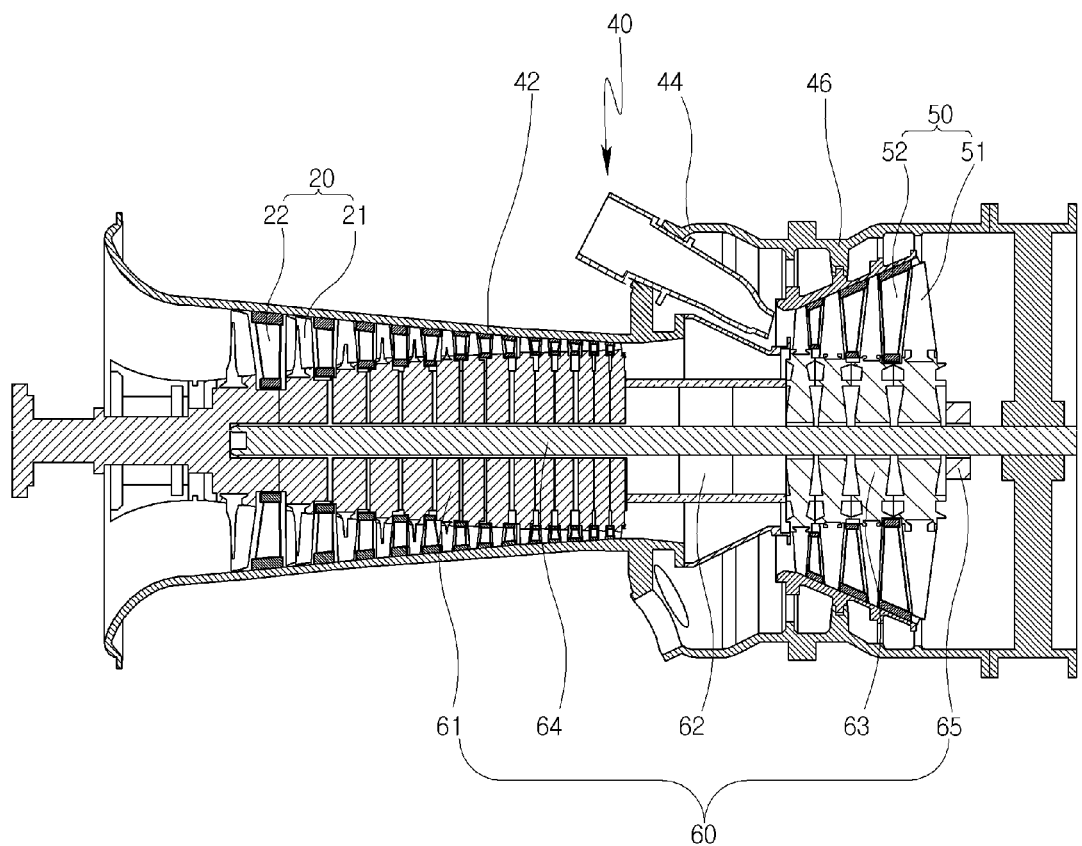

[FIG. 2]
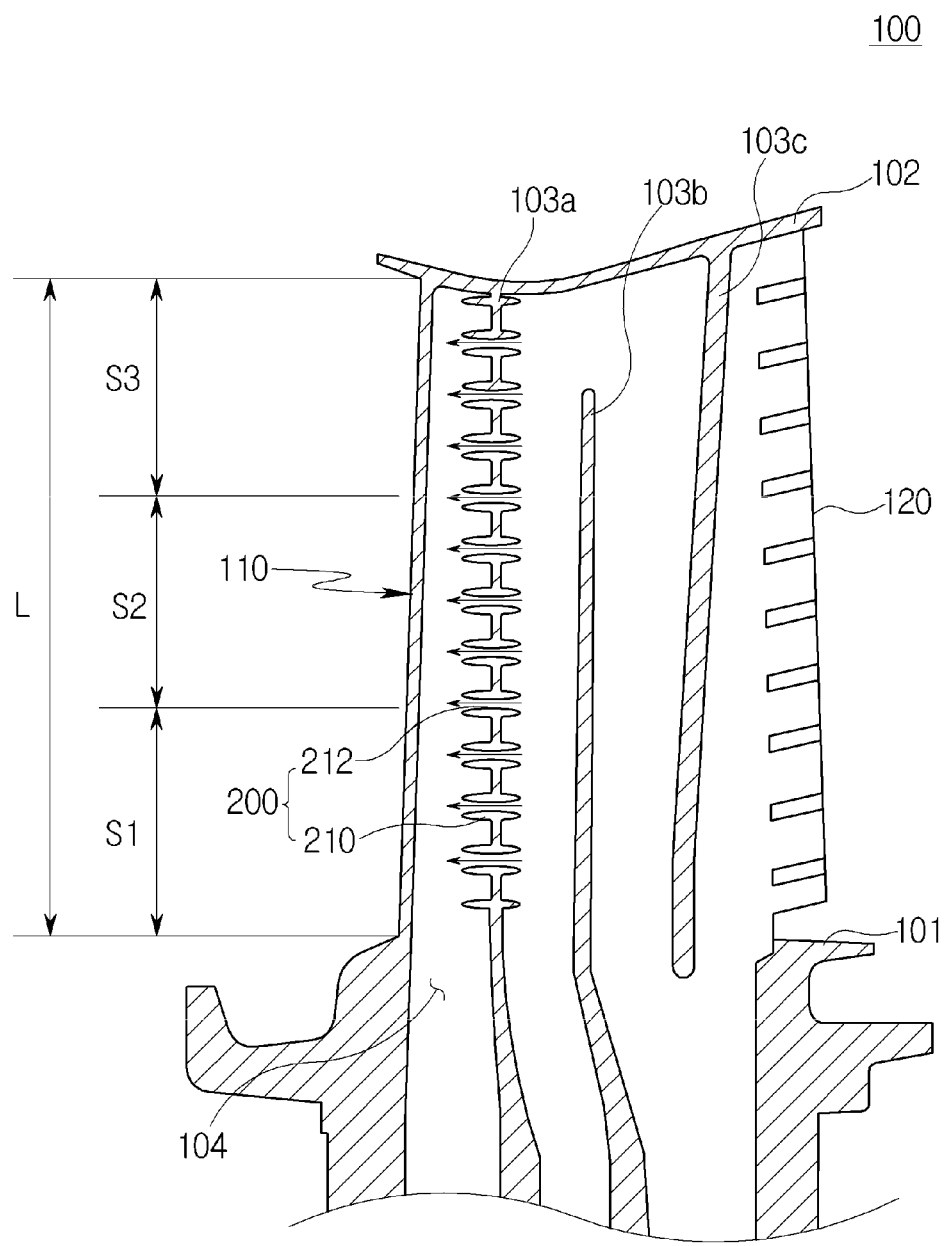

【FIG. 3A】
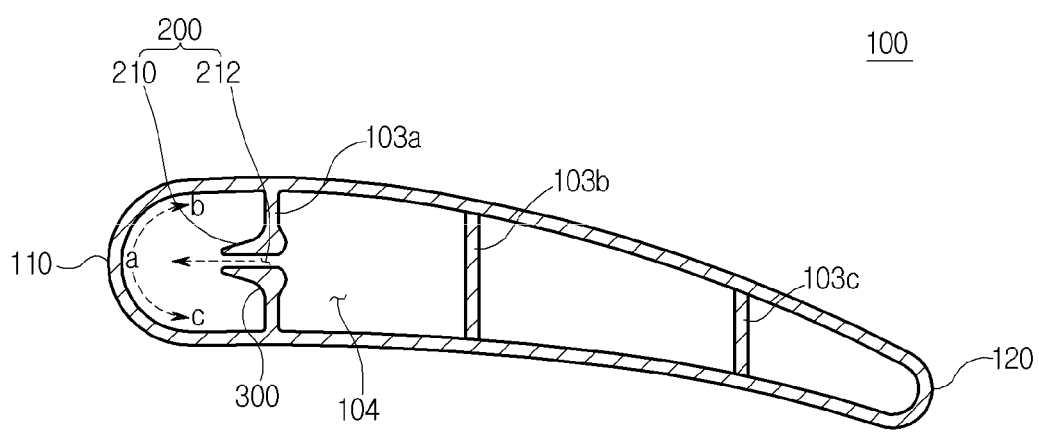

【FIG. 3B】
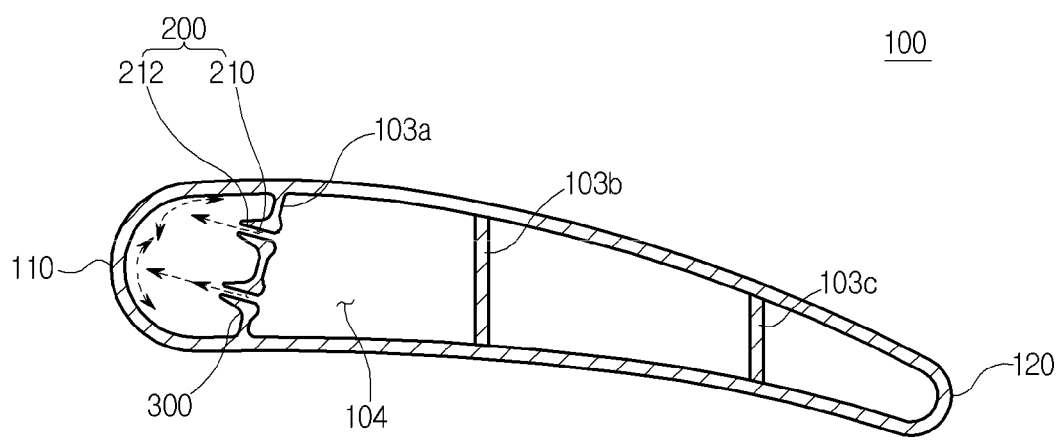

[FIG. 4]
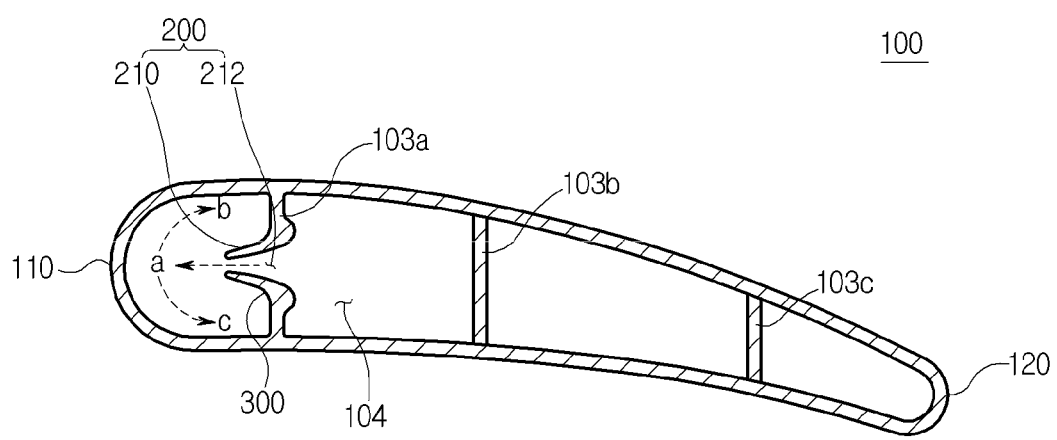

[FIG. 5]
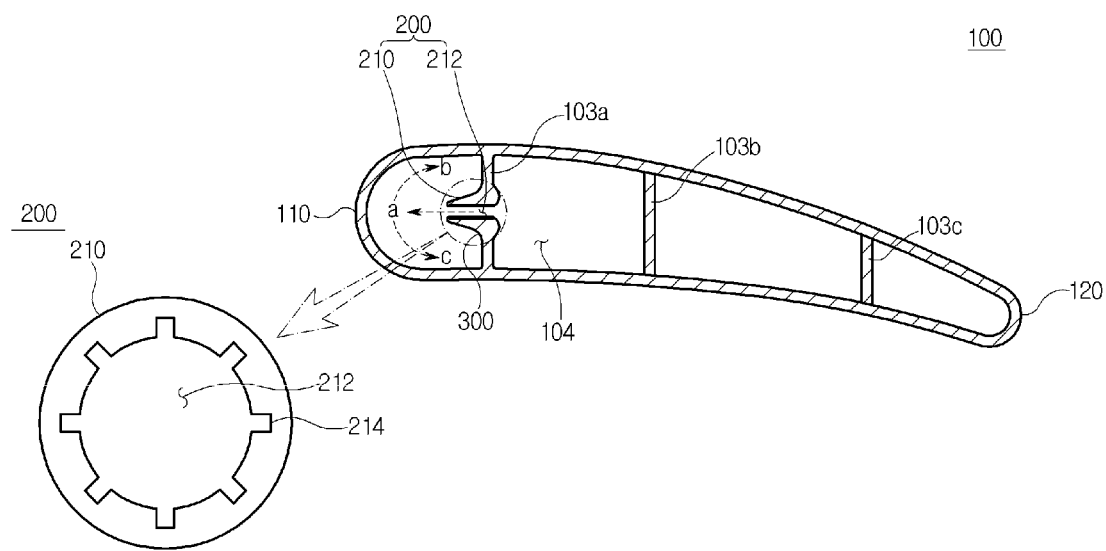

【FIG. 6】
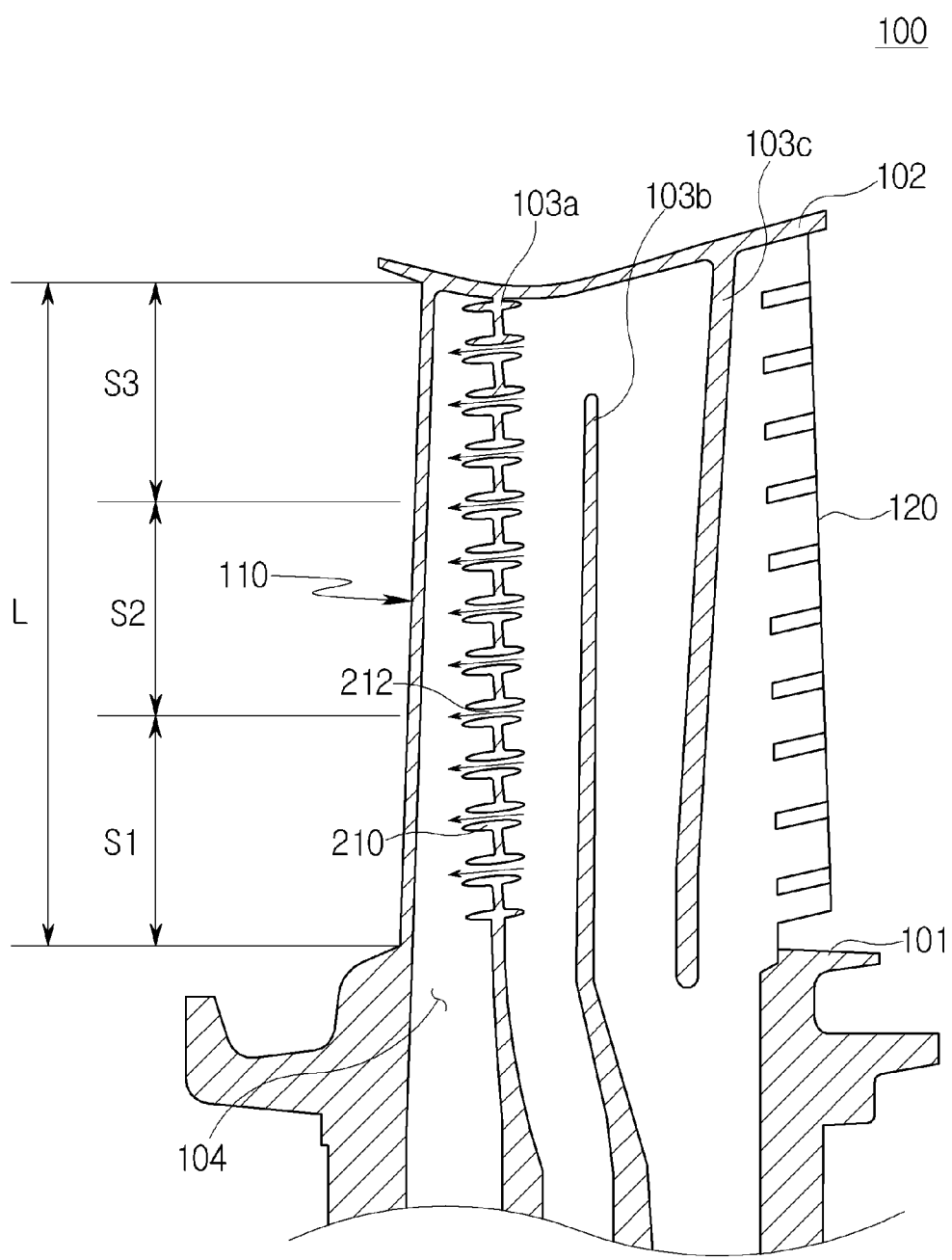

[FIG. 7]
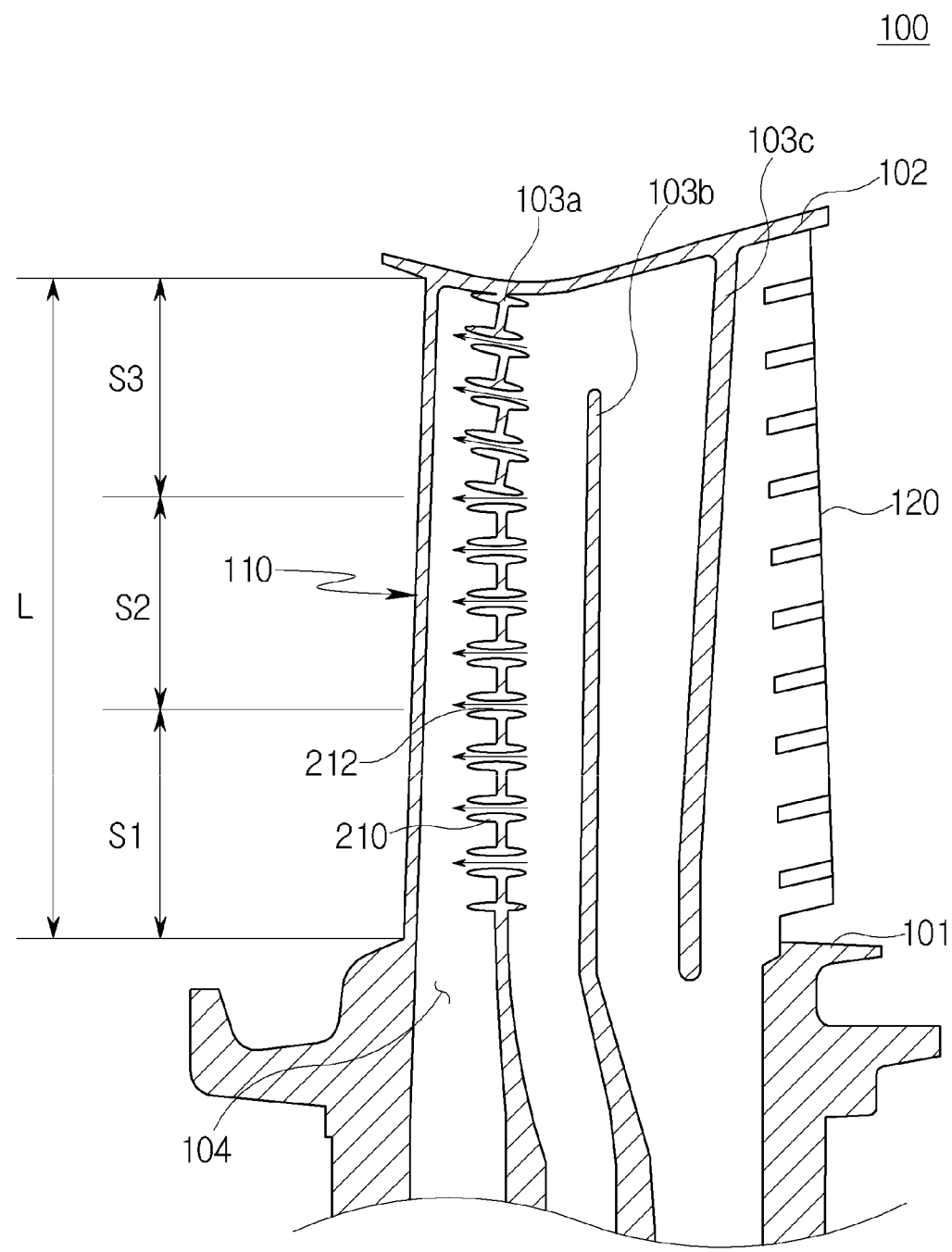

【FIG. 8】
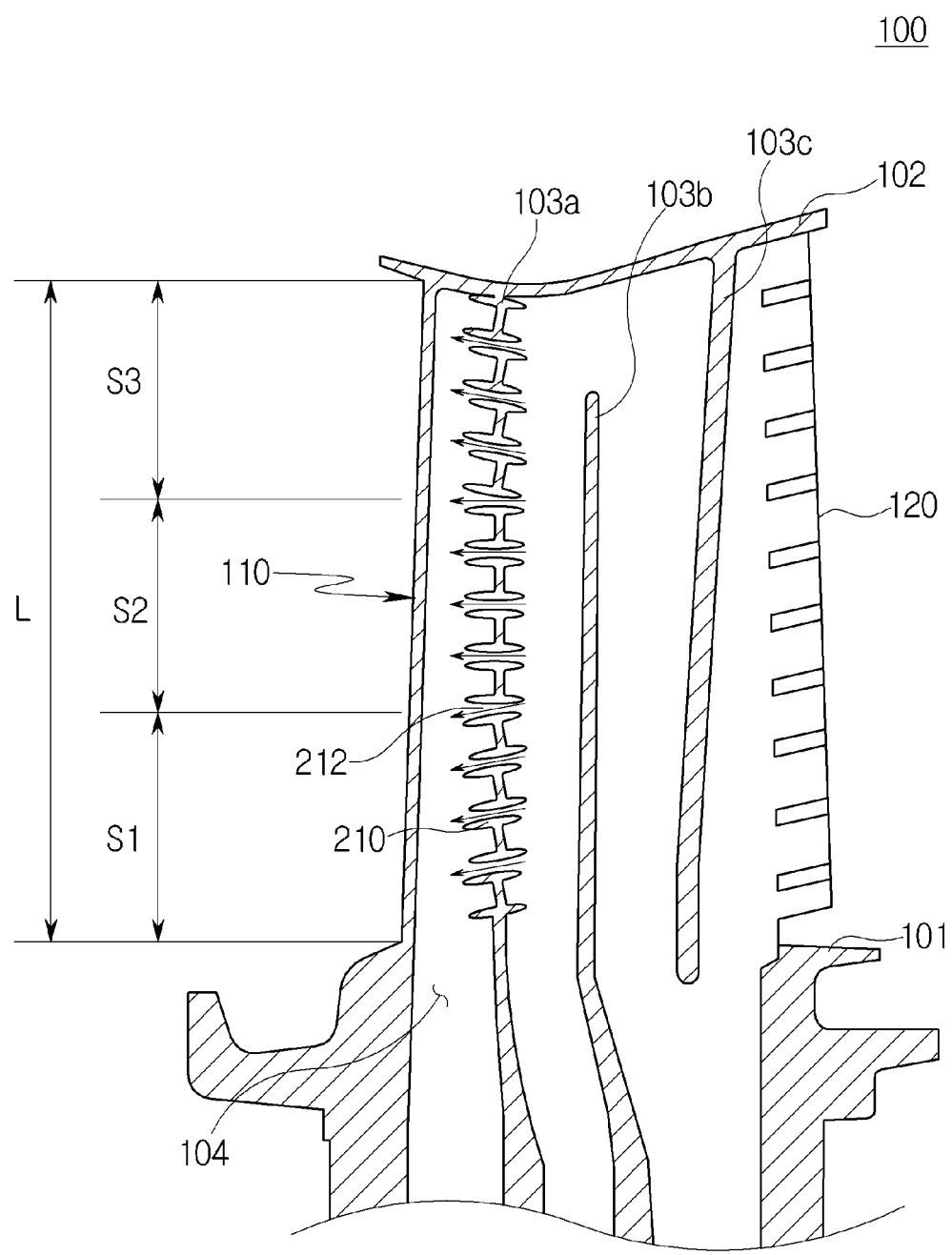

[FIG. 9]
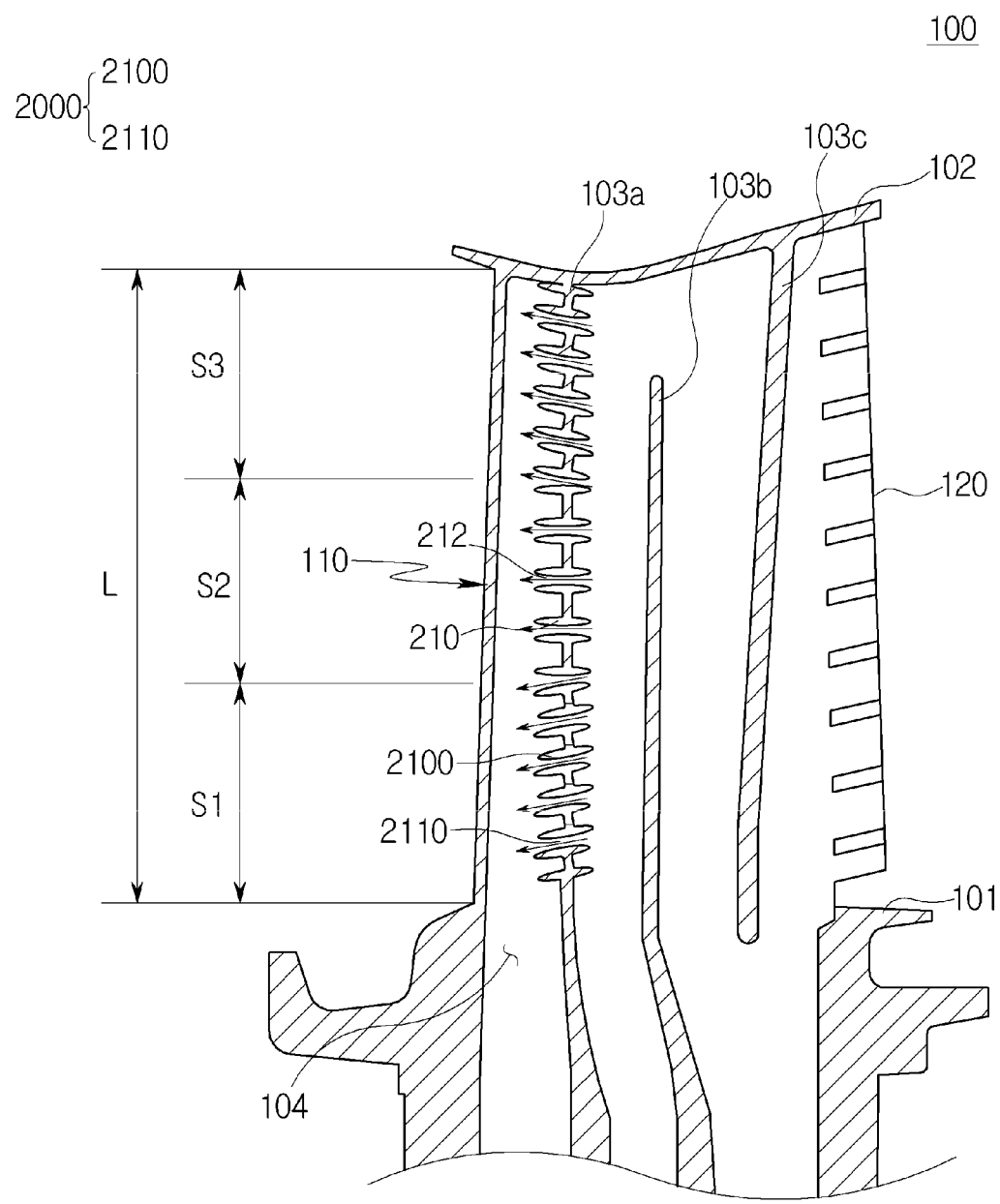

GAS TURBINE

CROSS-REFERENCE TO RELATED APPLICATIONS

This application claims priority to Korean Patent Application No. 10-2017-0126850, filed on Sep. 29, 2017, the disclosure of which is incorporated herein by reference in its entirety.

BACKGROUND OF THE DISCLOSURE

Field of the Disclosure

Exemplary embodiments of the present disclosure relate to a gas turbine in which cooling fluid flowing along a cooling passage formed in a turbine blade is transferred to and injected into a component to be cooled, thus promoting improvement in the cooling efficiency.

Description of the Related Art

Generally, schemes of increasing a turbine inlet temperature to enhance the performance of a gas turbine engine have been continuously proposed. However, an increase in the turbine inlet temperature causes problems of increasing a thermal load applied to a turbine blade and reducing the lifetime of the turbine blade.

Particularly, to relieve a thermal load structurally generated in a turbine blade, a forced cooling operation of supplying cooling fluid into the turbine blade is performed for the turbine blade.

Such a forced cooling method is a method of injecting cooling fluid discharged from a compressor of a gas turbine into a flow passage formed in the turbine blade, and generating forced convection, thus cooling the turbine blade. In the forced convection cooling, a cooling method using a nozzle protrusion-and-depression structure is used to enhance the cooling performance. The nozzle protrusion-and-depression structure is used to disturb the flow of cooling fluid in the flow passage and thus improve heat transfer efficiency.

In a conventional technique, a plurality of bar-type ribs disposed at an inclination angle have been used for a cooling function. However, depending on the inclination angle of the ribs, the cooling performance is distinctly changed. Therefore, countermeasures to this problem have been needed.

Furthermore, cooling fluid may not be evenly supplied into a specific region in the turbine blade, so that a problem arises in that the specific region may be disadvantageous in terms of thermal conduction.

SUMMARY OF THE DISCLOSURE

An object of the present disclosure is to provide a gas turbine in which a flow direction of cooling fluid to be supplied to a leading edge of a turbine blade that remains at a high temperature can be guided, and deformation and damage to components can be prevented from occurring due to stress concentration generated by collision with the cooling fluid.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a gas turbine may include a turbine blade including a leading edge, a trailing edge, and a plurality of partition walls defining a cooling passage for passing cooling air inside the turbine blade, a first partition wall of the plurality of partition walls facing the leading edge; and an injection nozzle disposed in the first partition wall to cool an inner surface of the leading edge.

The injection nozzle may include a nozzle protrusion protruding from the first partition wall toward the leading edge and surrounding an injection hole formed in the first partition wall. The nozzle protrusion may extend from the first partition wall toward the leading edge in a section from a hub of the turbine blade to a tip.

The nozzle protrusion may include a plurality of nozzle protrusions disposed to be inclined toward the leading edge in a section from a hub of the turbine blade to a tip, and the plurality of nozzle protrusions inject cooling air in different directions, respectively.

The injection hole may have a constant diameter, or may have a reduced diameter toward a distal end of the nozzle protrusion.

The nozzle protrusion may have a distal end that extends to a position near the leading edge.

The injection nozzle may include a nozzle buttress for strength reinforcement formed at one end of the nozzle protrusion, at a nozzle junction between the nozzle protrusion and the first partition wall.

The nozzle protrusion may have at least one groove formed in an inner circumferential surface of the injection hole.

The nozzle protrusion may be disposed facing a portion of a rounded inner surface of the leading edge that is farthest from the nozzle protrusion.

Assuming a length L of a section from a hub of the turbine blade 100 to a tip, the section may be divided into first, second, and third sections, each having a length of L/3. The first section may extend from the hub to a position L/3, the third section may extends from the tip to a position 2L/3, and the second section may be situated between the first and third sections. The first and third sections may remain at temperatures higher than a temperature of the second section.

The nozzle protrusion may include a plurality of nozzle protrusions extending to be inclined downward toward the leading edge in the first to third sections. Alternatively, the plurality of nozzle protrusions may extend directly toward the leading edge in the first and second sections and may extend to be inclined upward toward the leading edge in the third section. Alternatively, the plurality of nozzle protrusions may extend to be inclined downward toward the leading edge in the first section, may extend directly toward the leading edge in the second section, and may extend to be inclined upward toward the leading edge in the third section.

In accordance with another aspect of the present disclosure, a gas turbine may include the above turbine blade; and the injection nozzle. The injection nozzle may include a nozzle protrusion protruding from the first partition wall toward the leading edge and surrounding an injection hole formed in the first partition wall, the injection hole having in an inner circumferential surface in which a groove is formed; and a nozzle buttress for strength reinforcement formed at a junction between the nozzle protrusion and the first partition wall.

In accordance with another aspect of the present disclosure, a gas turbine may include a turbine blade including a leading edge, a trailing edge, and a plurality of partition walls defining a cooling passage for passing cooling air inside the turbine blade, a first partition wall of the plurality of partition walls facing the leading edge; and a plurality of injection nozzles disposed in the first partition wall to cool an inner surface of the leading edge, the plurality of injection nozzles residing at different disposition intervals with respect to a vertical direction of the first partition wall. Each injection nozzle may have a length greater than a thickness of the first partition wall It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view of a gas turbine in accordance with a first embodiment of the present disclosure;

FIG. 2 is a lengthwise sectional view of a turbine blade provided in the gas turbine in accordance with the first embodiment of the present disclosure;

FIGS. 3A and 3B are widthwise sectional views of the turbine blade in accordance with the first embodiment of the present disclosure;

FIG. 4 is a widthwise sectional view for illustrating a modification of the embodiment of either FIG. 3A or 3B;

FIG. 5 is a widthwise sectional view for illustrating another modification of the embodiment of either FIG. 3A or 3B, including an inset, cross-sectional diagram of the injection nozzle;

FIGS. 6 to 8 are lengthwise sectional views of other examples of the turbine blade in accordance with the first embodiment of the present disclosure; and FIG. 9 is a lengthwise sectional view of a turbine blade provided in a gas turbine in accordance with a second embodiment of the present disclosure.

DESCRIPTION OF SPECIFIC EMBODIMENTS

Terms or words used hereinafter should not be construed as having common or dictionary meanings, but should be construed as having meanings and concepts that comply with the technical spirit of the present disclosure on the basis of the principle that the inventor may appropriately define the concepts of the terms in order to best describe his or her disclosure. Accordingly, the following description and drawings illustrate exemplary embodiments of the present disclosure and do not fully represent the scope of the present disclosure. It would be understood by one of ordinary skill in the art that a variety of equivalents and modifications of the embodiments exist.

Embodiments of the present disclosure are described in detail below with reference to the accompanying drawings.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

The basic configuration of a gas turbine in accordance with a first embodiment of the present disclosure will be described with reference to FIG. 1.

Referring to FIG. 1, the gas turbine in accordance with the first embodiment includes a housing 30, a rotor 60 which is rotatably provided in the housing 30, and a compressor 20 configured to receive rotating force from the rotor 60 and compress air drawn into the housing 30.

The gas turbine further includes a combustor 40 configured to mix fuel with air compressed by the compressor 20 and ignite the fuel mixture to generate combustion gas, a turbine 50 configured to obtain rotating force from combustion gas generated from the combustor 40 and rotate the rotor 60, a generator interlocked with the rotor 60 to generate electricity, and a diffuser configured to exhaust combustion gas that has passed through the turbine 50.

The housing 30 includes a compressor housing 42 which houses the compressor 20, a combustor housing 44 which houses the combustor 40, and a turbine housing 46 which houses the turbine 50.

The compressor housing 42, the combustor housing 44, and the turbine housing 46 are successively arranged from an upstream side to a downstream side in a fluid flow direction.

The rotor 60 includes a compressor rotor disk 61, a turbine rotor disk 63, a torque tube 62, a tie rod 64, and a fastening nut 65. The compressor rotor disk 61 is housed in the compressor housing 42. The turbine rotor disk 63 is housed in the turbine housing 46. The torque tube 62 is housed in the combustor housing 44 and couples the compressor rotor disk 61 with the turbine rotor disk 63. The tie rod 64 and the fastening nut 65 couple the compressor rotor disk 61, the torque tube 62, and the turbine rotor disk 63 with each other.

In an embodiment, a plurality of compressor rotor disks 61 are provided. The plurality of compressor rotor disks 61 are arranged along an axial direction of the rotor 60. For instance, the compressor rotor disks 61 may have a multi-stage structure.

Each compressor rotor disk 61 may have, for example, a circular plate shape, and an outer circumferential surface in which a compressor blade coupling slot is formed for coupling with a compressor blade 21 to be described later. The compressor blade coupling slot may have a fir-tree shape to prevent the compressor blade 21 from escaping from the compressor blade coupling slot in a rotational radial direction of the rotor 60. A plurality of compressor blade coupling slots may be radially arranged along a circumferential direction of the compressor rotor disk 61.

The compressor rotor disk 61 and the compressor blade 21 are generally coupled to each other using a tangential type or an axial type scheme. In the present embodiment, the axial type scheme is used.

Meanwhile, the turbine rotor disk 63 may be formed in a manner similar to that of the compressor rotor disk 61. In an embodiment, a plurality of turbine rotor disks 63 may be provided. The plurality of turbine rotor disks 63 may be arranged along an axial direction of the rotor 60. For example, the turbine rotor disks 63 may form a multi-stage structure.

Each turbine rotor disk 63 may have an approximately circular plate shape, and an outer circumferential surface in which a turbine blade coupling slot is formed for coupling with a turbine blade 51 to be described later. The turbine blade coupling slot may have a fir-tree shape to prevent the turbine blade 51 from escaping from the turbine blade coupling slot in a rotational radial direction of the rotor 60. A plurality of turbine blade coupling slots may be radially arranged along a circumferential direction of the turbine rotor disk 63.

The turbine rotor disk 63 and the turbine blade 51 are generally coupled to each other using a tangential type or an axial type scheme. In the present embodiment, the axial type scheme is used.

The torque tube 62 is a torque transmission member configured to transmit the rotating force of the turbine rotor disks 63 to the compressor rotor disks 61. A first end of the torque tube 62 is coupled to one of the plurality of compressor rotor disks 61 that is disposed at the farthest downstream end with respect to an air flow direction. A second end of the torque tube 62 is coupled to one of the plurality of turbine rotor disks 63 that is disposed at the farthest upstream end with respect to a combustion gas flow direction.

A nozzle protrusion may be provided on each of the first and second ends of the torque tube 62. A depression to engage with the corresponding nozzle protrusion may be formed in each of the associated compressor rotor disk 61 and the associated turbine rotor disk 63. Thus, the torque tube 62 may be prevented from rotating relative to the compressor rotor disk 61 or the turbine rotor disk 63.

The torque tube 62 has a hollow cylindrical shape to allow air supplied from the compressor 20 to flow into the turbine 50 via the torque tube 62.

Taking into account characteristics of the gas turbine that is continuously operated for a long period of time, the torque tube 62 may be formed to resist to deformation, distortion, etc., and designed to be easily assembled and disassembled to facilitate maintenance.

The tie rod 64 may be provided passing through the plurality of compressor rotor disks 61, the torque tube 62, and the plurality of turbine rotor disks 63. A first end of the tie rod 64 may be coupled in one of the plurality of compressor rotor disks 61 that is disposed at the farthest upstream end with respect to the air flow direction. A second end of the tie rod 64 may protrude, away from the compressor 20, based on one of the plurality of turbine rotor disks 63 that is disposed at the farthest downstream end with respect to the combustion gas flow direction, and may be coupled to the fastening nut 65.

The fastening nut 65 is provided to compress, toward the compressor 20, the turbine rotor disk 63 that is disposed at the farthest downstream end. As the distance between the farthest upstream compressor rotor disk 61 and the farthest downstream turbine rotor disk 63 is reduced, the plurality of compressor rotor disks 61, the torque tube 62, and the plurality of turbine rotor disks 63 may be compressed in the axial direction of the rotor 60. Consequently, the plurality of compressor rotor disks 61, the torque tube 62, and the plurality of turbine rotor disks 63 may be prevented from moving in the axial direction or rotating relative to each other.

In the present embodiment, the single tie rod 64 is illustrated as being provided passing through the central portions of the plurality of compressor rotor disks 61, the torque tube 62, and the plurality of turbine rotor disks 63. However, the present disclosure is not limited to this structure. For example, separate tie rods 64 may be respectively provided in the compressor 20 and the turbine 50, a plurality of tie rods 64 may be arranged along the circumferential direction, or a combination of these may be used.

In accordance with the above-mentioned configuration, opposite ends of the rotor 60 may be rotatably supported by bearings 700, and one end may be coupled to a driving shaft of the generator.

The compressor 20 may include the compressor blade 21 which rotates along with the rotor 60, and a compressor vane 22 which is fixed in the housing 30 and configured to align the flow of air to be drawn onto the compressor blade 21.

In the embodiment, a plurality of compressor blades 21 may be provided. The plurality of compressor blades 21 may form a multi-stage structure along the axial direction of the rotor 60. A plurality of compressor blades 21 may be provided in each stage, and may be radially formed and arranged along a rotating direction of the rotor 60.

Each compressor blade 21 may include a planar compressor blade platform, a compressor blade root, and a compressor blade airfoil. The compressor blade root may extend from the compressor blade platform toward a central side of the rotor 60 with respect to the rotational radial direction of the rotor 60. The compressor blade airfoil may extend from the compressor blade platform toward a centrifugal side of the rotor 60 with respect to the rotational radial direction of the rotor 60.

The compressor blade platform may come into contact with an adjacent compressor blade platform, and function to maintain a distance between the adjacent compressor blade airfoils.

The compressor blade root may have a so-called axial type form, which is inserted into the compressor blade coupling slot along the axial direction of the rotor 60, as described above.

Furthermore, the compressor blade root may have a fir-tree shape to correspond to the compression blade coupling slot.

In the present embodiment, each of the compressor blade root and the compressor blade coupling slot is described as having a fir-tree shape, but the present disclosure is not limited thereto, and, for example, each may have a dovetail shape or the like. Alternatively, the compress blade 21 may instead be coupled to the compressor rotor disk 61 by using a separate coupling device, e.g., a fastener such as a key or a bolt.

With regard to the compressor blade root and the compressor blade coupling slot, the size of the compressor blade coupling slot may be greater than the compressor blade root so as to facilitate the coupling of the compressor blade root with the compressor blade coupling slot. In the coupled state, a clearance may be formed between the compressor blade root and the compressor blade coupling slot.

Although not shown, the compressor blade root and the compressor blade coupling slot may be fixed to each other by a separate pin so that the compressor blade root may be prevented from escaping from the compressor blade coupling slot in the axial direction of the rotor 60.

The compressor blade airfoil may be formed to have an optimized profile according to specifications of the gas turbine. The compressor blade airfoil may include a leading edge which is disposed at an upstream side with respect to the air flow direction and comes into contact with air, and a trailing edge which is disposed at a downstream side with respect to the air flow direction and comes into contact with air.

In the embodiment, a plurality of compressor vanes 22 may be provided. The plurality of compressor vanes 22 may form a multi-stage structure along the axial direction of the rotor 60. Here, the compressor vanes 22 and the compressor blades 21 may be alternately arranged along the air flow direction.

Furthermore, a plurality of compressor vanes 22 may be provided in each stage, and may be radially formed and arranged along the rotating direction of the rotor 60.

Each compressor vane 22 may include a pair of compressor vane platforms having an annular shape along the rotating direction of the rotor 60, and a plurality of compressor vane airfoils which extend between the compressor vane platforms in the rotational radial direction of the rotor 60. The compressor vane platforms may include a root-side compressor vane platform which is formed in a vane root of the compressor vane airfoil and coupled to the compressor housing 42, and a tip-side compressor vane platform which is formed in a vane tip of the compressor vane airfoil and faces the rotor 60.

The compressor vane platform configuration in accordance with the present embodiment includes the root-side and the tip-side compressor vane platforms so as to support both the vane root and the vane end of each compressor vane airfoil and thus more stably support the compressor vane airfoil. However, the present disclosure is not limited to the foregoing structure. For example, the compressor vane platform may be configured to include only the root-side compressor vane platform to support only the vane root of the compressor vane airfoil.

The compressor vane airfoil may be formed to have an optimized profile according to specifications of the gas turbine. The compressor vane airfoil may include a leading edge which is disposed at the upstream side with respect to the air flow direction and comes into contact with air, and a trailing edge which is disposed at the downstream side with respect to the air flow direction and comes into contact with air.

The combustor 40 functions to mix air supplied from the compressor 20 with fuel and combust the fuel mixture to generate high-temperature and high-pressure combustion gas having high energy, and may be configured to increase the temperature of the combustion gas to a heat resistance limit within which the combustor 40 and the turbine 50 can resist heat in an isobaric combustion process.

A plurality of combustors 40 may be provided. The plurality of combustors 40 may be arranged on the combustor housing 44 along the rotation direction of the rotor 60.

Each combustor 40 may include a liner into which air compressed by the compressor 20 is drawn, a burner configured to inject fuel to the air drawn into the liner and combust the fuel mixture, and a transition piece configured to guide combustion gas generated by the burner to the turbine 50.

The liner may include a flame tube which defines a combustion chamber, and a flow sleeve which encloses the flame tube and forms an annular space.

The burner may includes a fuel injection nozzle provided on a front end side of the liner to inject fuel to air drawn into the combustion chamber, and an ignition plug provided in a sidewall of the liner to ignite the fuel mixture formed by mixing the fuel with the air in the combustion chamber.

The transition piece may be configured such that an outer sidewall of the transition piece can be cooled by air supplied from the compressor 20 so as to prevent the transition piece from being damaged by high-temperature combustion gas.

A cooling hole is formed in the transition piece so that air can be injected into the transition piece through the cooling hole so as to cool a main body of the transition piece.

Air used to cool the transition piece may flow into the annular space of the liner, and collide with air provided as cooling air from the outside of the flow sleeve through a cooling hole formed in the flow sleeve that forms the outer sidewall of the liner.

Although not shown, a deswirler functioning as a guide vane may be provided between the compressor 20 and the combustor 40 so as to adjust a flow angle at which air is drawn into the combustor 40, to a design flow angle.

The turbine 50 may be formed in a manner similar to that of the compressor 20.

In detail, the turbine 50 may include the turbine blade 51 which rotates along with the rotor 60, and a turbine vane 52 which is fixed in the housing 30 and configured to align the flow of combustion gas to be drawn onto the turbine blade 51.

In the embodiment, a plurality of turbine blades 51 may be provided. The plurality of turbine blades 51 may form a multi-stage structure along the axial direction of the rotor 60. A plurality of turbine blades 51 may be provided in each stage, and may be radially formed and arranged along the rotating direction of the rotor 60.

Each turbine blade 51 may include a planar turbine blade platform, a turbine blade root, and a turbine blade airfoil. The turbine blade root may extend from the turbine blade platform toward a central side of the rotor 60 with respect to the rotational radial direction of the rotor 60. The turbine blade airfoil may extend from the turbine blade platform toward a centrifugal side of the rotor 60 with respect to the rotational radial direction of the rotor 60.

The turbine blade platform may come into contact with an adjacent turbine blade platform, and function to maintain a distance between the adjacent turbine blade airfoils.

The turbine blade root may have a so-called axial type form, which is inserted into the turbine blade coupling slot along the axial direction of the rotor 60, as described above.

Furthermore, the turbine blade root may have a fir-tree shape to correspond to the turbine blade coupling slot.

In the present embodiment, each of the turbine blade root and the turbine blade coupling slot is described as having a fir-tree shape, but the present disclosure is not limited thereto, and, for example, each may have a dovetail shape or the like. Alternatively, the turbine blade 51 may instead be coupled to the turbine rotor disk 63 by using a separate coupling device, e.g., a fastener such as a key or a bolt.

With regard to the turbine blade root and the turbine blade coupling slot, the size of the turbine blade coupling slot may be greater than that of the turbine blade root so as to facilitate the coupling of the turbine blade root with the turbine blade coupling slot.

In the coupled state, a clearance may be formed between the turbine blade root and the turbine blade coupling slot.

Although not shown, the turbine blade root and the turbine blade coupling slot may be fixed to each other by a separate pin so that the turbine blade root may be prevented from escaping from the turbine blade coupling slot in the axial direction of the rotor 60.

The turbine blade airfoil may be formed to have an optimized profile according to specifications of the gas turbine. The turbine blade airfoil may include a leading edge which is disposed at an upstream side with respect to the combustion gas flow direction so that combustion gas is incident on the leading edge, and a trailing edge which is disposed at a downstream side with respect to the combustion gas flow direction so that combustion gas exits the trailing edge.

In the embodiment, a plurality of turbine vanes 52 may be provided. The plurality of turbine vanes 52 may form a multi-stage structure along the axial direction of the rotor 60. Here, the turbine vanes 52 and the turbine blades 51 may be alternately arranged along the air flow direction.

Furthermore, a plurality of turbine vanes 52 may be provided in each stage, and may be radially formed and arranged along the rotating direction of the rotor 60.

Each turbine vane 52 may include a turbine vane platform having an annular shape along the rotating direction of the rotor 60, and a turbine vane airfoil which extends from the turbine vane platform in the rotational radial direction of the rotor 60.

The turbine vane platform may be configured to include a root-side turbine vane platform which is formed in a vane root of the turbine vane airfoil and coupled to the turbine housing 46, and a tip-side turbine vane platform which is formed in a vane tip of the turbine vane airfoil and faces the rotor 60.

The turbine vane airfoil may be formed to have an optimized profile according to specifications of the gas turbine. The turbine vane airfoil may include a leading edge which is disposed at the upstream side with respect to the combustion gas flow direction so that combustion gas is incident on the leading edge, and a trailing edge which is disposed at the downstream side with respect to the combustion gas flow direction so that combustion gas exits the trailing edge.

Unlike the compressor 20, the turbine 50 makes contact with high-temperature and high-pressure combustion gas. Hence, the turbine 50 requires a cooling unit for preventing damage such as thermal deterioration.

The gas turbine in accordance with the present embodiment may further include a cooling passage through which compressed air drawn out from some portions of the compressor 20 is supplied to the turbine 50.

The cooling passage may extend outside the housing 30 (defined as an external passage), or extend through the interior of the rotor 60 (defined as an internal passage). Alternatively, both the external passage and the internal passage may be used.

The cooling passage may communicate with a turbine blade cooling passage formed in the turbine blade 51 so that the turbine blade 51 can be cooled by cooling air.

The turbine blade cooling passage may communicate with a turbine blade film cooling hole formed in the surface of the turbine blade 51, so that cooling air is supplied to the surface of the turbine blade 51, whereby the turbine blade 51 may be cooled in a so-called film cooling manner by the cooling air.

In addition, the turbine vane 52 may also be formed to be cooled by cooling air supplied from the cooling passage, in a manner similar to that of the turbine blade 51.

The turbine 50 may have need of a clearance between the inner circumferential surface of the turbine housing 46 and a blade tip of each turbine blade 51 to allow the turbine blades 51 to smoothly rotate. An increased clearance is advantageous for preventing interference between the turbine blade 51 and the turbine housing 46, but is disadvantageous in terms of leakage of combustion gas. Reducing the clearance has the opposite effect.

In detail, the flow of combustion gas discharged from the combustor 40 is divided into a main flow which passes through the turbine blades 51, and a leakage flow which passes through the clearance between the turbine blades 51 and the turbine housing 46. As the clearance widens, the leakage flow rate is increased, thus reducing the efficiency of the gas turbine, but interference between the turbine blades 51 and the turbine housing 46 due to thermal deformation or the like can be prevented, and damage caused by the interference can also be prevented.

Conversely, as the clearance is reduced, the leakage flow rate is reduced so that the efficiency of the gas turbine can be enhanced, but interference between the turbine blades 51 and the turbine housing 46 due to thermal deformation or the like may be induced, and damage resulting from the interference may be caused.

The gas turbine in accordance with the present embodiment may further include a sealing unit configured to provide an appropriate clearance at which interference between the turbine blade 51 and the turbine housing 46 and damage resulting from the interference can be prevented, and a reduction in efficiency of the gas turbine can be minimized.

The sealing unit may include a shroud disposed on the blade tip of the turbine blade 51, a labyrinth seal which protrudes from the shroud toward the centrifugal side of the rotor 60 with respect to the rotational radial direction of the rotor 60, and a honeycomb seal installed on the inner circumferential surface of the turbine housing 46.

The sealing unit having the foregoing configuration may form an appropriate clearance between the labyrinth seal and the honeycomb seal so that the reduction in efficiency of the gas turbine due to leakage of combustion gas can be minimized, and the shroud that rotates at high speeds and the honeycomb seal that remains stationary can be prevented from coming into direct contact with each other, whereby damage resulting from the direct contact can also be prevented.

The turbine 50 may further include a sealing unit for preventing leakage between the turbine vanes 52 and the rotor 60. This sealing unit may employ a brush seal, etc. as well as the above-mentioned labyrinth seal.

In the gas turbine having the above-mentioned configuration, air drawn into the housing 30 is compressed by the compressor 20. The air compressed by the compressor 20 is mixed with fuel by the combustor 40, and then the fuel mixture is combusted by the combustor 40, so that combustion gas is generated. The combustion gas generated by the combustor 40 is drawn into the turbine 50.

The combustion gas drawn into the turbine 50 passes through the turbine blades 51 and thus rotates the rotor 60, before being discharged to the atmosphere through the diffuser. The rotor 60 that is rotated by the combustion gas may drive the compressor 20 and the generator.

In other words, some of the mechanical energy obtained from the turbine 50 may be supplied as energy needed for the compressor 20 to compress air, and the other mechanical energy may be used to produce electricity in the generator.

Hereinafter, a configuration for cooling the gas turbine in accordance with the first embodiment of the present disclosure having the above-mentioned configuration will be described with reference to the accompanying drawings.

FIGS. 2, 3A, and 3B show a turbine blade provided in the gas turbine in accordance with the first embodiment of the present disclosure. FIG. 4 illustrates a modification of the embodiment of either FIG. 3A or 3B.

Referring to FIGS. 2 to 4, in the gas turbine in accordance with the first embodiment of the present disclosure, cooling fluid flows along a cooling passage 104 formed in a turbine blade 100, and at least one injection nozzle 200 injects the cooling fluid onto a leading edge 110 of the turbine blade 100 so that the operation of cooling the turbine blade 100 can be reliably performed.

To this end, the turbine blade 100 in accordance with the first embodiment of the present disclosure includes the leading edge 110 provided on its front side and a trailing edge 120 provided on its rear side.

In the turbine blade 100, the cooling passage 104 is defined by a plurality of partition walls 103a, 103b, and 103c. The injection nozzles 200 are formed in the partition wall 103a that faces the leading edge 110 so as to cool an inner surface of the leading edge 110. This front-side-facing partition wall 103a may be referred to as the first partition wall 103a among the plurality of partition walls.

The partition walls 103a, 103b, and 103c are disposed at positions spaced apart from the leading edge 110 by predetermined distances while partitioning the internal space of the turbine blade 100.

The cooling passage 104 may correspond to a passage along which cooling fluid flows, and may be defined by the above-mentioned partition walls 103a, 103b, and 103c.

In the present embodiment, the operation of cooling the turbine blade 100 that is heated by hot gas passing through the turbine blade 100 can be reliably performed. Particularly, the present embodiment can promote reliable cooling of the turbine blade 100 by ensuring directivity of cooling fluid to be supplied to the leading edge 110 that remains at a high temperature, and preventing deformation or damage to the turbine blade 100 from occurring due to stress concentration.

The leading edge 110 is disposed at a position at which hot gas flowing toward the turbine blade 100 first comes into contact with the turbine blade 100. Thus, the leading edge 110 is continuously exposed to high-temperature conditions. The present embodiment may provide the turbine blade 100 that is capable of enhancing the efficiency of cooling the leading edge 110 and preventing the stiffness of the turbine blade 100 from deteriorating due to stress concentration applied to the injection nozzles 200, whereby the structural strength of the turbine blade 100 can be enhanced.

Hence, the efficiency of cooling the plurality of turbine blades 100 provided in the gas turbine can be enhanced, and the structural strength of the gas turbine can be reinforced.

To this end, each injection nozzle 200 according to the present disclosure includes a nozzle protrusion 210 which protrudes from the partition wall 103a of the turbine blade 100 toward the leading edge 110 and surrounds an injection hole 212 formed through the partition wall. The nozzle protrusion 210 extends from the partition wall 103a toward an inner surface of the leading edge 110, in a section from a hub 101 of the turbine blade 100 to a tip 102. The nozzle protrusion 210 is configured to supply, to the leading edge 110, cooling fluid supplied into the cooling passage 104. A plurality of nozzle protrusions 210 may be provided on the partition wall 103a, arranged from the hub 101 of the turbine blade 100 to the tip 102.

Although the length to which the nozzle protrusion 210 extends is not limited to a specific value, a distal end of the nozzle protrusion 210 may extend to a position near the leading edge 110. Alternatively, the first partition wall 103a may be disposed within the turbine blade 100 such that the nozzle protrusion 210 extends to a position near the leading edge 110. In any event, with the nozzle protrusion 210 disposed at a position near the leading edge 110, cooling fluid can be reliably supplied to the leading edge 110 required to be cooled, whereby the cooling fluid supply reliability can be enhanced.

Furthermore, since the flow direction of cooling fluid is guided by the nozzle protrusion 210, a phenomenon in which vortex currents are unnecessarily generated is reduced. Hence, the overall cooling efficiency of the turbine blade 100 is improved.

For example, the injection hole 212 extends with a predetermined diameter, so that movement of cooling fluid (represented by arrows) through the injection hole 212 can be accomplished with enhanced reliability.

Furthermore, heat exchange takes place when cooling fluid flows toward the leading edge 110 while simultaneously contacting an inner surface of the injection hole 212. Thus, rather than only injecting cooling fluid, the injection hole 212 can guide the flow direction of the cooling fluid and, simultaneously, promote improvement in cooling effect through the heat exchange resulting from the movement of cooling fluid.

In the present embodiment, the plurality of nozzle protrusions 210 protrude from the partition wall 103a toward the leading edge 110, and each nozzle protrusion 210 is configured such that its thickness is reduced toward the distal end. Therefore, the configuration having the nozzle protrusions 210 does not specially increase the weight of the turbine blade 100, thereby not leading to problems which may be caused by an increase in weight.

The nozzle protrusions 210 may be disposed to be inclined in different directions throughout the section extending from the hub 101 of the turbine blade 100 to the tip 102. In this case, the nozzle protrusions 210 are disposed such that the directions in which the nozzle protrusions 210 are oriented differ from each other to supply cooling fluid toward parts of the turbine blade 100 where high-temperature conditions are retained. Here, one or more of the nozzle protrusions 210 are said to be disposed in different directions. By being thus disposed in different directions, a plurality of nozzle protrusions 210 are provided and the nozzle protrusions 210 inject cooling air in respectively varying or alternative directions. As shown in FIG. 3B, multiple nozzle protrusions 210 may be provided in the partition wall 103a at a given point along the length (L) of the turbine blade 100.

The respective nozzle protrusions 210 extend in different directions, so that cooling air can be injected toward different positions of the inner surface of the leading edge 110 to cool different portions of the leading edge 110. Thus, a cooling area can be increased.

In the injection nozzle 200 in accordance with the present embodiment, the diameter of the injection hole 212 remains constant. Taking into account the fact that the flow rate and the speed of cooling air change depending on the diameter of the injection hole 212, the diameter of the injection hole 212 is set to a specific value so as to enhance the cooling efficiency for the leading edge 110 under optimum conditions.

Referring to FIG. 4, the injection nozzle 200 in accordance with the present embodiment may be configured such that the diameter of the injection hole 212 is reduced toward the distal end of the nozzle protrusion 210.

In this case, since the injection hole 212 of the injection nozzle 200 has a nozzle shape, cooling fluid is injected toward the leading edge 110 at an increased speed. In the case where the injection hole 212 has the above-mentioned shape, the speed of cooling fluid injected onto the leading edge 110 is increased compared to that of the injection hole 212 having a constant diameter, so that it is advantageous for the case where there is a need to rapidly cool the leading edge 110.

The nozzle protrusion 210 in accordance with the present embodiment is provided with a nozzle buttress 300 formed for strength reinforcement at a position connected with the partition wall. The nozzle buttress 300 is formed to relieve stress concentration which is caused by movement or collision of cooling fluid. The nozzle buttress 300 may be configured in such a way that the thickness of the nozzle protrusion 210 is increased or a reinforcement is added to the nozzle protrusion 210.

The nozzle protrusion 210 has a rounded surface so that stress can be dispersed rather than being concentrated on a specific position even when cooling fluid collides with the nozzle protrusion 210. Therefore, cooling fluid can be reliably moved to the leading edge 110 through the injection hole 212, and a stress concentration problem due to the protruding structure of the nozzle protrusion 210 can be solved.

The nozzle buttress 300 is formed at a nozzle junction (refer to source circle of inset) between the nozzle protrusion 210 and the partition wall 103a that faces the leading edge 110. The nozzle junction corresponds to a position at which direct collision occurs due to movement of cooling fluid. Thus, the nozzle buttress 300 is provided at the corresponding position.

The injection nozzle 200 in accordance with the present embodiment is formed of a plurality of nozzle protrusions 210, and some of the cooling fluid ejected from the respective nozzle protrusions 210 may be mixed with each other after having injected onto the leading edge 110. However, if some of the cooling fluid ejected from the respective nozzle protrusions 210 is mixed with each other around outlets of the nozzle protrusions 210, vortex currents may be unnecessarily generated, whereby the cooling efficiency may be reduced.

In the present embodiment, to minimize the vortex phenomenon, at least one groove 214 may be provided so as to promote improvement in the cooling efficiency of the leading edge 110 and the overall cooling efficiency of the turbine blade 100.

The nozzle protrusion 210 in accordance with the present embodiment is disposed facing a portion of the rounded inner surface of the leading edge 110 that is farthest from the nozzle protrusion 210. For instance, the inner surface portion farthest from the nozzle protrusion 210 corresponds to a rounded protruding portion of the leading edge 110, which corresponds to position a of FIG. 3A, 4, or 5.

In the case where cooling fluid is injected onto position a, the cooling fluid moves along the inner surface of the leading edge 110 from position a to either of positions b and c while cooling the leading edge 110. In this case, cooling fluid can sufficiently perform the operation of cooling the inner surface of the leading edge 110 without loss of injection energy, so that improvement in the cooling efficiency of the turbine blade 100 can be promoted.

In the present embodiment, assuming a length L of the section from the hub 101 of the turbine blade 100 to the tip 102, the section may be divided into first, second, and third sections S1, S2, and S3, each having a length of L/3. The first section S1 extends from the hub 101 to a position L/3, and the third section S3 extends from the tip 102 to a position 2L/3. The second section S2 is situated between the first section S1 and the third section S3. The first and third sections 51 and S3 remain at temperatures higher than that of the second section S2.

In the turbine blade 100, the temperature conditions of the leading edge 110 change depending on positions between the hub 101 and the tip 102. For example, the temperature conditions of the leading edge 110 may change depending on the respective sections described above.

The nozzle protrusions 210 may extend to be inclined downward toward the leading edge 110 in the first to third sections S1 to S3.

Cooling fluid may be ejected downward in a direction from the tip 102 of the turbine blade 100 to the hub 101. In this case, movement of cooling fluid is caused in such a way that it flows inside the leading edge 110 in one direction as shown by an arrow with a broken line.

In this case, generation of vortex currents due to mixture of cooling fluid can be minimized, whereby improvement in the cooling efficiency of the turbine blade 100 can be promoted.

Referring to FIG. 5, the nozzle protrusion 210 has grooves 214 which are formed in the inner surface of the injection hole 212 and arranged in a circumferential direction. For example, each groove 214 has a linear shape extending along the injection hole 212. When cooling fluid is ejected toward the leading edge 110, the cooling fluid passes via the grooves 214 formed in the injection hole 212.

The grooves 214 may guide the direction of movement of cooling fluid and apply rotating force to the cooling fluid. For instance, if the grooves 214 are linearly formed, the straightness may be enhanced. Furthermore, since cooling fluid is ejected via the grooves 214 without reduction in flow speed, generation of unnecessary vortex currents may be minimized.

Referring to FIG. 6, the nozzle protrusions 210 extend to be inclined downward toward the leading edge 110 in the first to third sections 51 to S3, and inject cooling air toward the inner surface of the leading edge 110. In this case, the injection direction of cooling air is guided toward a lower side of the inner surface of the leading edge 110 to promote cooling of the turbine blade 100.

Referring to FIG. 7, the nozzle protrusions 210 in accordance with the present embodiment directly (laterally) extend toward the leading edge 110 in the first and second sections S1 and S2, and extend to be inclined upward toward the leading edge 110 in the third section S3.

In this case, in the first and second sections 51 and S2, cooling fluid is injected in the lateral direction, and, in the third section S3, cooling fluid is injected upward and then mixed with the cooling fluid that has been injected in the first and second section S1 and S2.

In the case where cooling of the turbine blade 100 in the third section S3 is needed, the nozzle protrusions 210 may be configured in the foregoing manner, thus enhancing the cooling efficiency.

Referring to FIG. 8, the nozzle protrusions 210 in accordance with the present embodiment extend to be inclined downward toward the leading edge 110 in the first section S1, directly extend toward the leading edge 110 in the second section S2, and extend to be inclined upward toward the leading edge 110 in the third section S3.

In this case, cooling fluid is injected in the lateral direction in the second section S2, injected downward in the first section S1, and injected upward in the third section S3. In other words, in the first to third sections 51 to S3, cooling fluid is injected at respective different directions. Improvement in the cooling efficiency of the turbine blade 100 can be promoted by independently injecting cooling fluid for each section.

The present disclosure may provide a method of manufacturing the turbine blade 100 with the injection nozzle 200 for gas turbine.

A gas turbine in accordance with a second embodiment of the present disclosure will be described with reference to FIG. 9.

Referring to FIG. 9, the gas turbine in accordance with the present embodiment is provided with a turbine blade 100, which includes a leading edge 110 and a trailing edge 120, and in which a cooling passage 104 defined by a plurality of partition walls is formed. The gas blade 100 includes injection nozzles 2000 which are formed in a partition wall facing the leading edge 110 so as to cool an inner surface of the leading edge 110. The injection nozzles 2000 reside at different disposition intervals with respect to the vertical direction of the partition wall.

The turbine blade 100 in accordance with the second embodiment of the present disclosure includes the leading edge 110 provided on its front side and the trailing edge 120 provided on its rear side.

In the turbine blade 100, the cooling passage 104 is defined by a plurality of partition walls 103a, 103b, and 103c. The injection nozzles 2000 are formed in the partition wall 103a that faces the leading edge 110 so as to cool the inner surface of the leading edge 110.

The partition walls 103a, 103b, and 103c are disposed at positions spaced apart from the leading edge 110 by predetermined distances while partitioning the internal space of the turbine blade 100.

The cooling passage 104 may correspond to a passage along which cooling fluid flows, and may be defined by the above-mentioned partition walls 103a, 103b, and 103c.

In the present embodiment, the operation of cooling the turbine blade 100 that is heated by hot gas passing through the turbine blade 100 can be reliably performed. Particularly, the present embodiment can promote reliable cooling of the turbine blade 100 by ensuring directivity of cooling fluid to be supplied to the leading edge 110 that remains at a high temperature and preventing deformation or damage to the turbine blade 100 from occurring due to stress concentration.

The leading edge 110 is disposed at a position at which hot gas flowing toward the turbine blade 100 first comes into contact with the turbine blade 100. Thus, the leading edge 110 is continuously exposed to high-temperature conditions. The present embodiment may provide the turbine blade 100 that is configured to enhance the efficiency of cooling the leading edge 110 and prevent the stiffness of the turbine blade 100 from deteriorating due to stress concentration applied to the injection nozzle 2000, whereby the structural strength of the turbine blade 100 can be enhanced.

Hence, the efficiency of cooling the plurality of turbine blades 100 provided in the gas turbine can be enhanced, and the structural strength of the gas turbine can be reinforced.

To this end, each injection nozzle 2000 according to the present disclosure includes a nozzle protrusion 2100 which protrudes from the partition wall 103a of the turbine blade 100 toward the leading edge 110 and surrounds an injection hole 2110 formed through the partition wall. The nozzle protrusion 2100 extends from the partition wall 103a toward an inner surface of the leading edge 110, in a section from the hub 101 of the turbine blade 100 to the tip 102. The nozzle protrusion 2100 is configured to supply, to the leading edge 110, cooling fluid supplied into the cooling passage 104. A plurality of nozzle protrusions 2100 may be provided on the partition wall 103a, arranged from a hub 101 of the turbine blade 100 to a tip 102.

Although the length to which the nozzle protrusion 2100 extends is not limited to a specific value, a distal end of the nozzle protrusion 2100 may extend to a position near the leading edge 110. Alternatively, the first partition wall 103a may be disposed within the turbine blade 100 such that the nozzle protrusion 2100 extends to a position near the leading edge 110. In any event, with the nozzle protrusion 2100 disposed at a position near the leading edge 110, cooling fluid can be reliably supplied to the leading edge 110 required to be cooled, whereby the cooling fluid supply reliability can be enhanced.

Furthermore, since the flow direction of cooling fluid is guided by the nozzle protrusion 2100, a phenomenon in which vortex currents are unnecessarily generated is reduced. Hence, the overall cooling efficiency of the turbine blade 100 is improved.

For example, the injection hole 2110 extends with a predetermined diameter, so that movement of cooling fluid (represented by arrows) through the injection hole 2110 can be accomplished with enhanced reliability.

Furthermore, heat exchange takes place when cooling fluid flows toward the leading edge 110 while simultaneously contacting an inner surface of the injection hole 212. Thus, rather than only injecting cooling fluid, the injection hole 212 can guide the flow direction of the cooling fluid and, simultaneously, promote improvement in cooling effect through the heat exchange resulting from the movement of cooling fluid.

In the present embodiment, a plurality of nozzle protrusions 2100 protrude from the partition wall 103a toward the leading edge 110, and each nozzle protrusion 210 is configured such that its thickness is reduced toward the distal end. Therefore, the configuration having the nozzle protrusions 2100 does not specially increase the weight of the turbine blade 100, thus not leading to problems which may be caused by an increase in weight.

The nozzle protrusions 2100 may be disposed to be inclined in different directions in the section from the hub 101 of the turbine blade 100 to the tip 102. In this case, the nozzle protrusions 2100 are disposed such that the directions in which the nozzle protrusions 210 are oriented differ from each other to supply cooling fluid toward parts where high-temperature conditions are retained. The foregoing configuration has been described in the description of the first embodiment with reference to FIG. 3B; therefore, further explanation will be omitted.

In the injection nozzle 2000 in accordance with the present embodiment, the diameter of the injection hole 2110 remains constant. Taking into account the fact that the flow rate and the speed of cooling air change depending on the diameter of the injection hole 2110, the diameter of the injection hole 2110 is set to a specific value so as to enhance the cooling efficiency for the leading edge 110 under optimum conditions.

The nozzle protrusion 2100 in accordance with the present embodiment is disposed facing a portion of the rounded inner surface of the leading edge 110 that is farthest from the nozzle protrusion 2100. For example, the portion farthest from the nozzle protrusion 2100 corresponds to a rounded protruding portion of the leading edge 110, which corresponds to position a of the inner surface of the leading edge 110, as shown in FIG. 3A described above.

Unlike the first embodiment described above, in the present embodiment, the injection nozzles 2000 reside at different disposition intervals with respect to the vertical direction of the partition wall 103a. Depending on temperature distributions of the inner surface of the leading edge 110, the disposition intervals of the injection nozzles 2000 may be increased or reduced. The disposition state of the injection nozzles 2000 will be described in more detail along with the following description of first to third sections S1 to S3.

In the present embodiment, assuming a length L of the section from the hub 101 of the turbine blade 100 to the tip 102, the section may be divided into first, second, and third sections S1, S2, and S3, each having a length of L/3. The first section S1 extends from the hub 101 to a position L/3, and the third section S3 extends from the tip 102 to a position 2L/3. The second section S2 is situated between the first section S1 and the third section S3. The first and third sections S1 and S3 remain at temperatures higher than that of the second section S2. Hence, the disposition intervals of the injection nozzles 2000 in the first and third sections S1 and S3 are less than that of the injection nozzles 200 (formed of the nozzle protrusions 210 and injection holes 212) in the second section S2.

To achieve more efficient cooling of the first and third sections S1 and S3 that remain at high-temperature conditions, the injection nozzles 2000 are densely disposed in the first and third sections S1 and S3. Here, the meaning of the term "dense" is limited to the disposition state shown in the drawing rather than being particularly numerically limited.

However, it is to be noted that the disposition intervals of the injection nozzles 2000 may be changed without being limited to that shown in the drawing and the disposition intervals shown in the drawing are only one example.

With regard to the injection nozzles 2000, the number of nozzle protrusions 2100 disposed in the second section S2 is less than that of the first and third sections S1 and S3, and detailed intervals are not limited.

Each injection nozzle 2000 has a length greater than the thickness of the partition wall 103a facing the leading edge 110. Although the length of the injection nozzle 2000 is not limited to a specific length, the above-described configuration is provided to reliably inject cooling fluid onto the leading edge 110.

In embodiments of the present disclosure, the direction of cooling fluid is guided when the cooling fluid is injected into a leading edge of a turbine blade, so that a desired portion of the turbine blade can be reliably cooled, whereby the efficiency of cooling the gas turbine can be enhanced.

In embodiments of the present disclosure, each nozzle protrusion has an increased length so that heat exchange efficiency is enhanced while cooling fluid flows through the nozzle protrusion. Furthermore, the structure of the turbine blade is improved such that stress concentration due to collision with the cooling fluid is minimized, whereby the structural stiffness of the turbine blade can be enhanced.

While the present disclosure has been described with respect to the specific embodiments, the present disclosure is not to be limited to the disclosed embodiments and it will be apparent to those skilled in the art that various changes and modifications may be made without departing from the spirit and scope of the disclosure as defined in the following claims.

What is claimed is:

1. A gas turbine comprising:
a turbine blade including a leading edge, a trailing edge, and a plurality of partition walls defining a cooling passage for passing cooling air inside the turbine blade, the plurality of partition walls including a first partition wall that faces the leading edge and is divided in a vertical direction according to a plurality of sections of the leading edge that are arranged from a hub of the turbine blade to a tip of the turbine blade, the turbine blade from the hub to the tip having a length L and being divided into first, second, and third sections of the leading edge such that each of the first, second, and third sections has a length of L/3, the first section extending from the hub to a position L/3, the third section extending from the tip to a position 2L/3, and the second section situated between the first and third sections; and
an injection nozzle disposed in the first partition wall and configured to cool an inner surface of the leading edge, the injection nozzle comprising a plurality of nozzle protrusions each of which protrudes from the first partition wall toward the leading edge and surrounds an injection hole formed in the first partition wall, each of the plurality of nozzle protrusions including an inlet and an outlet and being inclined in a specific direction according to one of the first to third sections,
wherein the plurality of nozzle protrusions are configured to inject cooling air in a different direction for each section of the plurality of sections, each section of the plurality of sections juxtaposed to nozzle protrusions injecting cooling air in only one direction,
wherein the plurality of nozzle protrusions include a plurality of first nozzle protrusions, a plurality of second nozzle protrusions, and a plurality of third nozzle protrusions and are arranged in the first partition wall such that each of the plurality of first nozzle protrusions faces the first section, each of the plurality of second nozzle protrusions faces the second section, and each of the plurality of third nozzle protrusions faces the third sections,
wherein the specific direction of each of the plurality of third nozzle protrusions is inclined upward toward the leading edge in the third section,
wherein each of the plurality of first nozzle protrusions extends directly toward the leading edge in the first section, and
wherein each of the plurality of second nozzle protrusions extends directly toward the leading edge in the second section.

2. The gas turbine according to claim 1, wherein the injection hole has a constant diameter.

3. The gas turbine according to claim 1, wherein each nozzle protrusion has a distal end, and the injection hole has a reduced diameter toward the distal end.

4. The gas turbine according to claim 1, wherein each of the plurality of nozzle protrusions includes a length from the first partition wall to a distal end of a corresponding nozzle protrusion of the plurality of nozzle protrusions, and the first partition wall is disposed at a distance from the leading edge of the turbine blade, and
wherein the distal end of the corresponding nozzle protrusion extends to a position with respect to the leading edge, the position determined by the nozzle protrusion length and the first partition wall distance so that the cooling air can be reliably supplied to the leading edge.

5. The gas turbine according to claim 1, wherein the injection nozzle includes a nozzle buttress that is formed at a nozzle junction between each nozzle protrusion and the first partition wall and is configured to reinforce structural strength of the injection nozzle at a position of the injection nozzle that is connected with the first partition wall.

6. The gas turbine according to claim 1, further comprising a plurality of linear grooves formed in an inner circumferential surface of the injection hole and arranged in a circumferential direction, each linear groove extending lengthwise along the injection hole and having opposite ends communicating respectively with the cooling passage on either side of the first partition wall.

7. The gas turbine according to claim 1,
wherein the first partition wall extends between an inner wall of each of a suction side and a pressure side of the turbine blade, and the leading edge includes a rounded inner surface having a curvature that communicates respectively with the inner wall of each of the suction and pressure sides,
wherein each of the plurality of nozzle protrusions faces a juxtaposed portion of the rounded inner surface,
wherein the juxtaposed portion of the rounded inner surface is farther away from a corresponding nozzle protrusion of the plurality of nozzle protrusions than any other portion of the rounded inner surface.

8. A gas turbine comprising:
a turbine blade including a leading edge, a trailing edge, and a plurality of partition walls defining a cooling passage for passing cooling air inside the turbine blade, a first partition wall of the plurality of partition walls facing the leading edge, the turbine blade from a hub of the turbine blade to a tip of the turbine blade having a length L and being divided into first, second, and third sections of the leading edge such that each of the first, second, and third sections has a length of L/3, the first section extending from the hub to a position L/3, the third section extending from the tip to a position 2L/3, and the second section situated between the first and third sections; and
a plurality of injection nozzles disposed in the first partition wall and configured to cool an inner surface of the leading edge by injecting cooling air in a different direction for each of the first, second, and third sections, each section juxtaposed to injection nozzles injecting cooling air in only one direction, the plurality of injection nozzles including:
first injection nozzles disposed in the first section and separated from each other by a first disposition interval, the first injection nozzles extending so as to be inclined downward toward the leading edge in the first section,
second injection nozzles disposed in the second section and separated from each other by a second disposition interval, the second injection nozzles extending directly toward the leading edge in the second section,
third injection nozzles disposed in the third section and separated from each other by the first disposition interval, the third injection nozzles extending so as to be inclined upward toward the leading edge in the first section,
wherein the second disposition interval is different from the first disposition interval such that there are fewer of the second injection nozzles than either of the first and third injection nozzles.

9. The gas turbine according to claim 8, wherein the disposition intervals of the injection nozzles in the first and third sections are less than disposition intervals of the injection nozzles in the second section, so that the injection nozzles in in the first and third sections are denser than the injection nozzles in the second section.

10. The gas turbine according to claim 8, wherein each injection nozzle comprises a nozzle protrusion protruding from the first partition wall toward the leading edge and surrounding an injection hole formed in the first partition wall.

11. The gas turbine according to claim 8, wherein each injection nozzle has a length greater than a thickness of the first partition wall.

12. A gas turbine comprising:
a turbine blade including a leading edge, a trailing edge, and a plurality of partition walls defining a cooling passage for passing cooling air inside the turbine blade, the plurality of partition walls including a first partition wall that faces the leading edge and is divided in a vertical direction according to a plurality of sections of the leading edge that are arranged from a hub of the turbine blade to a tip of the turbine blade, the turbine blade from the hub to the tip having a length L and being divided into first, second, and third sections of the leading edge such that each of the first, second, and third sections has a length of L/3, the first section extending from the hub to a position L/3, the third section extending from the tip to a position 2L/3, and the second section situated between the first and third sections; and
an injection nozzle disposed in the first partition wall and configured to cool an inner surface of the leading edge, the injection nozzle comprising a plurality of nozzle protrusions each of which protrudes from the first partition wall toward the leading edge and surrounds an injection hole formed in the first partition wall, each of the plurality of nozzle protrusions including an inlet and an outlet and being inclined in a specific direction according to one of the first to third sections,
wherein the plurality of nozzle protrusions are configured to inject cooling air in a different direction for each section of the plurality of sections, each section of the plurality of sections juxtaposed to nozzle protrusions injecting cooling air in only one direction,
wherein the plurality of nozzle protrusions include a plurality of first nozzle protrusions, a plurality of second nozzle protrusions, and a plurality of third nozzle protrusions and are arranged in the first partition wall such that each of the plurality of first nozzle protrusions faces the first section, each of the plurality of second nozzle protrusions faces the second section, and each of the plurality of third nozzle protrusions faces the third sections,
wherein each of the plurality of third nozzle protrusions is inclined upward toward the leading edge in the third section,
wherein each of the plurality of first nozzle protrusions is inclined downward toward the leading edge in the first section, and
wherein each of the plurality of second nozzle protrusions directly extends toward the leading edge in the second section.

* * * * *